US007017974B2

(12) United States Patent
Tong et al.

(10) Patent No.: US 7,017,974 B2
(45) Date of Patent: Mar. 28, 2006

(54) ROTARY DOOR OPERATOR

(75) Inventors: Haibo Tong, Palapine, IN (US); Marianne Krbec, Elmhurst, IL (US)

(73) Assignee: Wabtec Holding Corporation, Wilmerding, PA (US)

( * ) Notice: Subject to any disclaimer, the term of this patent is extended or adjusted under 35 U.S.C. 154(b) by 7 days.

(21) Appl. No.: 10/744,041

(22) Filed: Dec. 23, 2003

(65) Prior Publication Data

US 2005/0134082 A1 Jun. 23, 2005

(51) Int. Cl.
*B60J 7/00* (2006.01)

(52) U.S. Cl. .................... 296/146.4; 74/99 A; 277/402

(58) Field of Classification Search ............ 296/146.4, 296/146.6; 74/99 A; 277/402
See application file for complete search history.

(56) References Cited

U.S. PATENT DOCUMENTS 4,813,293 A 3/1989 Fink

*Primary Examiner*—Joseph D. Pape
(74) *Attorney, Agent, or Firm*—The Webb Law Firm

(57) ABSTRACT

A cover arrangement for a rotary door operator of a transit vehicle includes a cover with a cavity for encasing the components of the rotary door operator and with an aperture for engaging an elastomer seal coupled around an output shaft of the rotary door operator. An elastomer grommet is provided for enabling coupling of the manual release cable or handle. Additional apertures may be provided for routing of the fluid pressure lines and electrical wires.

16 Claims, 3 Drawing Sheets

ROTARY DOOR OPERATOR

CROSS-REFERENCE TO CO-PENDING APPLICATIONS

This application is closely related to co-pending U.S. Ser. No. 10/744,919 entitled "Lock Mechanism for a Rotary Door Operator", to co-pending U.S. Ser. No. 10/744,038 entitled "Unlock Mechanism for a Rotary Door Operator", filed concurrently herewith. These applications being assigned to the assignee of the present invention and the disclosures of these co-pending applications are hereby incorporated by reference thereto.

FIELD OF THE INVENTION

The present invention relates, in general, to a rotary door operator, and, more particularly, the instant invention relates to a rotary door operator for transit vehicle door systems and, yet more particularly, the instant invention relates to a rotary door operator having a "zero-lead" or a "Lift and Lock" locking feature.

BACKGROUND OF THE INVENTION

Prior to the development of the present invention, as is generally well known in the art, a rotary door operator is mainly used in the inter-city bus coaches. These rotary operators are available in two distinct types, commonly referred to as zero-lead and lift-and-lock. Either door operator type can be adapted for use with pneumatic or hydraulic fluids.

Both rotary door operator types comprise a double acting cylinder typically attached to a flanged mounting bracket. The mounting bracket has an aperture for an output shaft which is attached at one end to the piston disposed with the double acting cylinder and coupled with a door post at a distal end. A cover is generally provided for encasing the double acting cylinder as well as any other rotary door operator components attached either to the double acting cylinder or to the mounting bracket.

In typical applications, the rotary door operator is mounted to the structure of the transit vehicle adjacent the portal aperture with the output shaft being vertically oriented in an upward direction in order to couple with the rotating door post. In such orientation and in such close proximity to the exterior surface of the transit vehicle, the rotary door operator is exposed to the environmental factors, such as dirt, dust, and especially moisture, when the door is opened to enable passenger ingress and egress of a particular concern is the aperture disposed within the mounting bracket which enables connection of the output shaft with the drive cylinder. Since the output shaft must be allowed to move both rotatably and axially, the aperture must be designed with sufficient clearance to enable such movement. However, such clearance also enables the environmental factors to infiltrate the interior portion of the door operator.

U.S. Pat. No. 4,813,293 to Fink teaches a cover arrangement for a rotary door operator which utilizes a cup-shaped seal fitting in an annular grove in the output shaft in combination the outwardly projecting collar disposed integrally within the output shaft and further disposed above such annular grove. The seal rests firmly against the surface of the mounting bracket adjacent the exposed end of the output shaft. Additionally, the opposite surface of the mounting bracket is provided with a perimeter seal for accepting the main cover member of such rotary door operator.

There are several disadvantages related to this type of design. In the first aspect, the outwardly projecting integral collar results in increased manufacturing costs of the output shaft which is generally machined either from a solid round stock or form the casting having additional material for machining allowance. In the second aspect, the perimeter groove in the mounting bracket requires a certain precision in cover manufacturing in order to achieve a predetermined fit. In the third aspect, the cup-shaped seal must be temporarily expanded during an assembly to fit over the collar and into the annular groove thus increasing the complexity of the assembly and disassembly process.

As it can be seen from the above discussion there is a need for a simplified approach to prevent infiltration of environmental factors into the interior portion of the rotary door operator.

SUMMARY OF THE INVENTION

A cover arrangement is provided for a rotary door operator employed for opening and closing a door of a transit vehicle door system. The rotary door operator typically has a mounting bracket with a first surface portion for attachment to a structure of the transit vehicle and a second surface portion, a drive cylinder enabled by a source of a fluid pressure, an output shaft connected to a piston of the drive cylinder for reciprocal movement therewith. The cover arrangement comprises a cover having a cavity for encasing components of a rotary door operator which is oriented toward the structure of the transit vehicle. An output shaft aperture is provided for enabling passage of the output shaft. The cover is attached to the second surface portion of the mounting bracket for ease of attachment and removal.

An output shaft seal of a predetermined material and of a first predetermined thickness is disposed within the output shaft aperture. The seal has a perimeter groove disposed in its edge for capturing an edge of the output shaft aperture. The groove is formed by a pair of side wall surfaces and a bottom wall surface. An aperture fitted with a grommet is provided for enabling coupling of the manual release cable or handle. The output shaft seal also has an outwardly extending circular flange for snug fit around the output shaft. Additional apertures may be provided in the cover for enabling passages of fluid pressure lines or electrical wires.

OBJECTS OF THE INVENTION

It is, therefore, one of the primary objects of the present invention to provide a simple and reliable cover for a rotary door operator.

It is another object of the present invention to provide a cover for a rotary door operator which enables attachment of the manual release devices such as a lever and a cable without enabling water infiltration.

It is a further object of the present invention to provide a cover for a rotary door operator which reduces manufacturing costs.

It is an additional object of the present invention to provide a cover for a rotary door operator which enables ease of assembly and disassembly.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
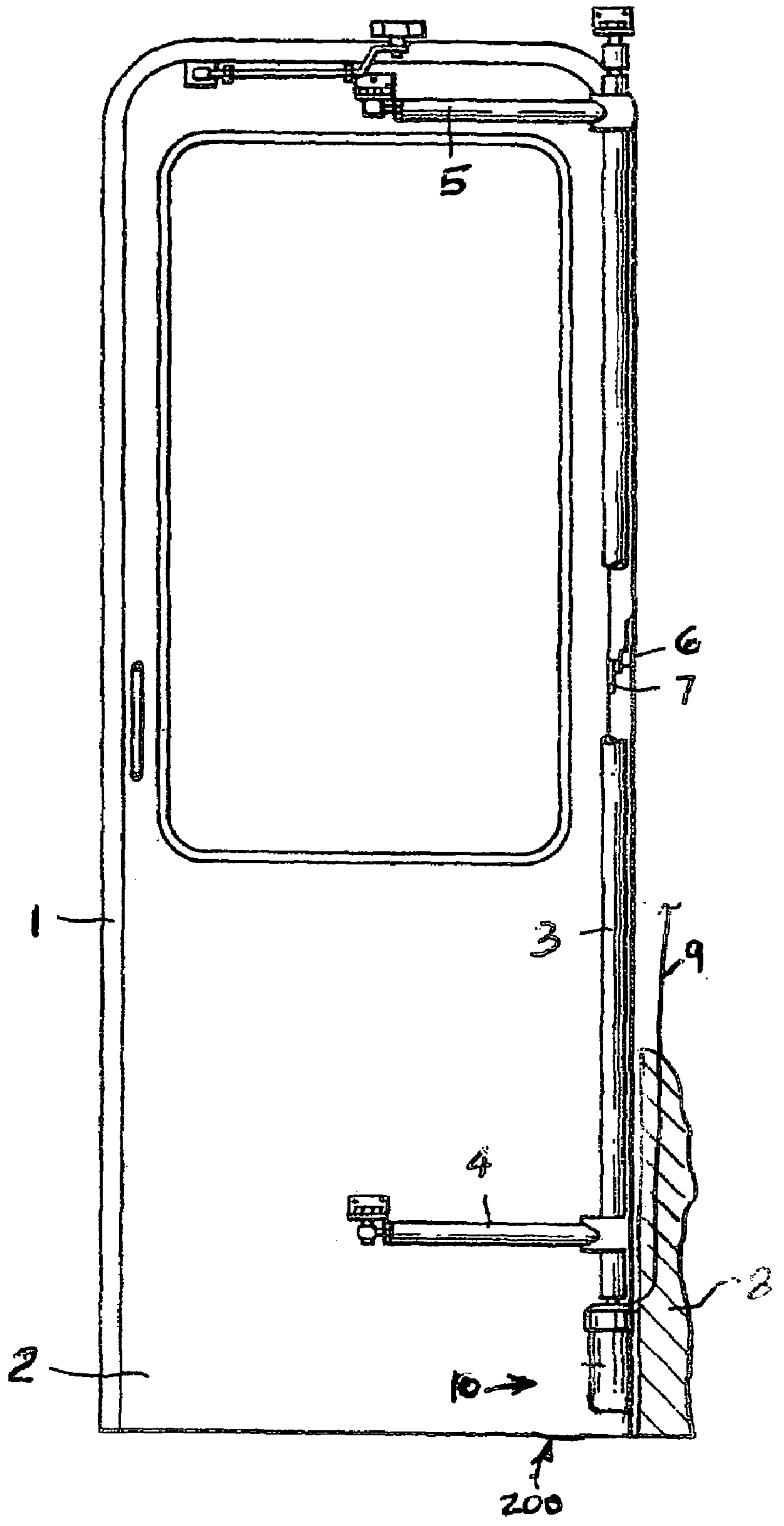
FIG. 1 is a plan view of a typical door system utilizing a rotary door operator.

BRIEF DESCRIPTION OF THE PREFERRED AND ALTERNATIVE EMBODIMENTS OF THE PRESENT INVENTION

Before describing the invention in detail, the reader is advised that, for the sake of clarity and understanding, identical components having identical functions have been marked where possible with the same reference numerals in each of the Figures provided in this document.

Figure 2:
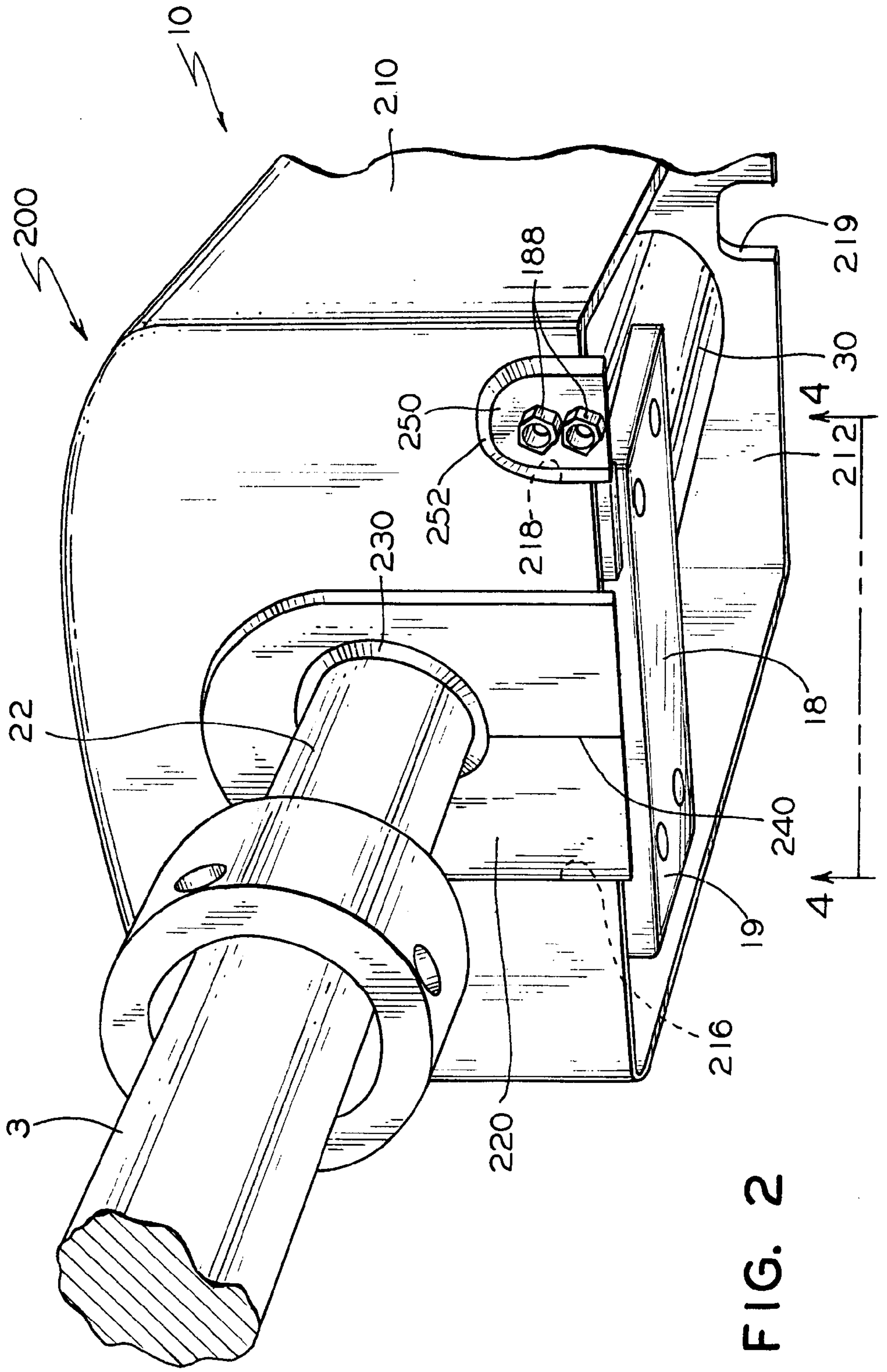
FIG. 2 is a perspective view of the cover arrangement of the present invention.

The reader's attention is directed to to FIGS. 1 and 2, wherein is illustrated a typical door system which utilizes a rotary door operator, generally designated 10. Such door system typically comprises a door 2 disposed within portal aperture 1 of a transit vehicle (not shown). The door 2 is supported by the first and second arms 4 and 5 respectively which are attached to a well known door post 3. The door post 3 is pivotally attached to the transit vehicle structure 8 at one end and pivotally attached to the rotary door operator 10 at a distal end. Such rotary door operator 10 enables a rotation of the door post 3 and further enables a movement of the door 2 in a closing and an opening direction. A stationary wedge element 6 attached to the transit vehicle structure 8 and a movable wedge element 7 attached to the door 2 and engaging such stationary wedge element 6 are provided for locking the door 2 in a closed position.

Figure 3:
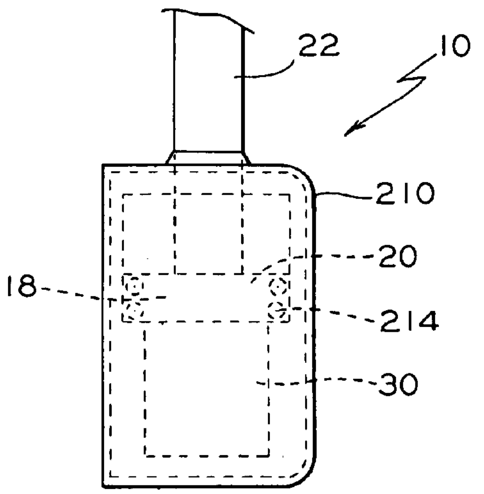
FIG. 3 is a plan views of the cover arrangement of the present invention.

The rotary door operator 10, best illustrated in FIGS. 2 and 3 comprises an operator mounting bracket 18 having a first surface portion 19 for attachment thereof to the transit vehicle structure 8. A drive cylinder 30, is attached to such operator mounting bracket 18 at a second surface portion 20 thereof. An output shaft 22 is coupled to the drive cylinder 30 at one end and coupled to the door post 3 at a distal end.

A cover arrangement, generally designated 200, of the present invention comprises a cover 210 having a cavity 212 for encasing at least a portion of the rotary door operator 10, at least one mounting cavity 214 and an output shaft aperture 216 enabling passage of the output shaft 22. As best illustrated in FIG. 1, such cavity 212 is disposed adjacent the structure 8 of the transit vehicle. Preferably such at least one mounting cavity 214 is provided adjacent the second surface portion 20 of the mounting bracket 18 for ease of attachment and removal.

A first seal means 220 engageble with the output shaft aperture 216 is provided for preventing moisture infiltration of the output shaft 22 through the output shaft aperture 216. Such means 220 is of a predetermined material and of a first predetermined thickness 222. Preferably, such predetermined material is a molded elastomer including but not limited to natural and synthetic rubber. Such first seal means 220 comprises a perimeter grove 224 disposed within the first predetermined thickness 22. The groove 224 is formed by a pair of side wall surfaces 226 and a bottom wall surface 228. Preferably each side wall surface 226 is angled toward an open top surface of the groove 224. Such configuration of the groove 224 will enable thickness variance of the cover 210 and ease of assembly without degrading sealing capabilities.

Preferably, a second seal means 230 of a second predetermined thickness 232 and a first predetermined height 234 is disposed outwardly toward the door post 3. Preferably the second seal means 230 is angled toward the output shaft 22 from the first seal means 220. It is further preferred that such second predetermined thickness 232 of the means 230 is smaller than the first predetermined thickness 222 of the first seal means 220 for enabling close coupling with the output shaft 22.

Figure 4:
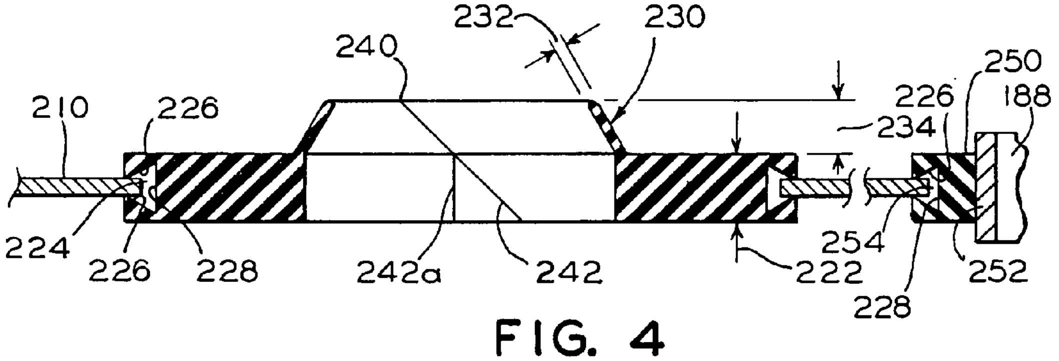
FIG. 4 is a partial end view particularly showing output shaft seal along lines 4—4 in FIG. 2.
Figure 5A:
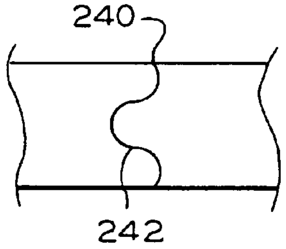
FIG. 5*a*–5*b* is an end view of the output shaft seal particularly showing alternative embodiments of the slit.
Figure 5B:
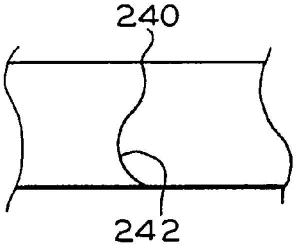

A slit 240, best illustrated in FIG. 2, which starts at a first edge and axially continues through the second seal means 230 is provided for enabling ease of installation of the first seal means 220 onto the output shaft 22. Preferably the pair of edge surfaces 242 formed by the slit 240 in the first seal means 220 are angled, as best illustrated in FIG. 4 to compensate for break in first seal means 220 continuity caused by the slit 240. Alternatively, such pair of edge surfaces 242 may be straight as indicated by reference numeral 242*a* in FIG. 4. It will be further understood, that such pair of edge surfaces 242 can be of an interlocking type including but not limited to the types illustrated in FIGS. 5*a* and 5*b*. It is well known that such pair of edge surfaces 242 can be manufactured by first molding the first seal means 220 in two halves and then fusing them together along predetermined edge portions.

In further reference to FIG. 2, a cover 210 is provided with at least one manual release aperture 218 for enabling passage of the manual release means such as cable 9 or handle (not shown). Preferably, a manual release seal means 250 is provided for preventing water infiltration through such at least one manual release aperture 218 when the cable 9 is routed through the top portion of the cover 210 adjacent the output shaft 22. Such manual release seal means 250 has at least one aperture 252 snugly engaging manual release guiding means 188 and a perimeter groove 254 which is identical to the perimeter groove 224 of the first seal means 220.

At least one aperture 219 may be provided within the cover 210 for enabling passage of a pressure fluid line and electrical wires.

While the presently preferred and alternative embodiments of the instant invention has been described in detail above in accordance with the patent statutes, it should be recognized that various other modifications and adaptations of the invention may be made by those persons who are skilled in the relevant art without departing from either the spirit of the invention or the scope of the appended claims.

We claim:

1. A cover arrangement for a rotary door operator for opening and closing a door of a transit vehicle door system, said rotary door operator having a mounting bracket with a first surface portion for attachment to a structure of such transit vehicle and a second surface portion, a drive cylinder enabled by a source of fluid pressure, an output shaft connected to a piston of said drive cylinder for reciprocal movement therewith, said cover arrangement comprising:

(a) a cover having a cavity for encasing at least a portion of said rotary door operator, said cavity disposed adjacent such structure of such transit vehicle, at least one mounting cavity for attachment to said second surface portion of said mounting bracket for ease of attachment and removal, and an output shaft aperture; and (b) a first seal means of a predetermined material and of a first predetermined thickness having a perimeter groove disposed within said first predetermined thickness for capturing an edge of said output shaft aperture, said perimeter grove is formed by a pair of side wall surfaces and a bottom wall surface.

2. A cover arrangement for a rotary door operator according to claim 1 wherein said cover further includes at least one manual release aperture for enabling passage of a manual release means therethrough.

3. A cover arrangement for a rotary door operator according to claim 2, wherein said manual release means is a cable.

4. A cover arrangement for a rotary door operator according to claim 1 wherein said wall surfaces of said perimeter groove are angularly disposed toward an edge of said first seal means, said angularly disposed wall surfaces enabling a thickness variance of said cover.

5. A cover arrangement for a rotary door operator according to claim 1 wherein said cover arrangement further includes an outwardly disposed second seal means of a predetermined height and a second predetermined thickness.

6. A cover arrangement for a rotary door operator according to claim 5 wherein said second seal means includes a flange angled toward its center.

7. A cover arrangement for a rotary door operator according to claim 5 wherein said second predetermined thickness of said second seal means is smaller than said first predetermined thickness of said first seal means.

8. A cover arrangement for a rotary door operator according to claim 1 wherein said first seal means further includes an axially disposed slit forming a pair of edge surfaces disposed therein.

9. A cover arrangement for a rotary door operator according to claim 8, wherein said pair of edge surfaces is one of straight and angled.

10. A cover arrangement for a rotary door operator according to claim 9, wherein said pair of edge surfaces is straight.

11. A cover arrangement for a rotary door operator according to claim 1 wherein said predetermined material is an elastomer.

12. A cover arrangement for a rotary door operator according to claim 11, wherein said elastomer is molded.

13. A cover arrangement for a rotary door operator according to claim 12, wherein said elastomer is one of natural rubber, synthetic rubber, and combination thereof.

14. A cover arrangement for a rotary door operator according to claim 13, wherein said predetermined material is a synthetic rubber.

15. A cover arrangement for a rotary door operator according to claim 2 wherein said at least one manual release aperture is provided with a manual release seal means of a first predetermined thickness having a perimeter groove disposed within said first predetermined thickness for capturing an edge of said at least one manual release aperture, said perimeter groove is formed by a pair of said side wall surfaces and a bottom wall surface, said manual release seal means further having at least one aperture for snugly engaging a manual release guiding means disposed within said rotary door operator.

16. A cover arrangement for a rotary door operator according to claim 1 wherein said cover further includes at least one aperture enabling passage of one of a fluid pressure line and an electrical wire.

* * * * *

UNITED STATES PATENT AND TRADEMARK OFFICE
CERTIFICATE OF CORRECTION

PATENT NO. : 7,017,974 B2
APPLICATION NO. : 10/744041
DATED : March 28, 2006
INVENTOR(S) : Tong et al.

It is certified that error appears in the above-identified patent and that said Letters Patent is hereby corrected as shown below:

Cover of the Patent, see Item (75) Inventors: "Haibo Tong, Palapine, IN (US)" should read -- Haibo Tong, Palatine, IL (US) --

Column 5, Line 7, Claim 1, "said perimeter grove" should read -- said perimeter groove --

Signed and Sealed this

Thirteenth Day of April, 2010

David J. Kappos
*Director of the United States Patent and Trademark Office*